(12) United States Patent
Henderson

(10) Patent No.: US 8,386,950 B2
(45) Date of Patent: Feb. 26, 2013

(54) METHODS, SYSTEMS AND COMPUTER PROGRAM PRODUCTS FOR ARRANGING A PLURALITY OF ICONS ON A TOUCH SENSITIVE DISPLAY

(75) Inventor: Andrew Henderson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 562 days.

(21) Appl. No.: 12/754,020

(22) Filed: Apr. 5, 2010

(65) Prior Publication Data

US 2011/0246918 A1 Oct. 6, 2011

(51) Int. Cl.
*G06F 3/00* (2006.01)
(52) U.S. Cl. ........ 715/769; 715/770; 715/748; 715/810; 715/813
(58) Field of Classification Search .................. 715/769, 715/770, 748, 810
See application file for complete search history.

(56) References Cited

U.S. PATENT DOCUMENTS

| | | | | |
|---|---|---|---|---|
| 7,370,281 | B2 * | 5/2008 | Weber | 715/769 |
| 7,650,575 | B2 * | 1/2010 | Cummins et al. | 715/769 |
| 2005/0177796 | A1 * | 8/2005 | Takahashi | 715/769 |
| 2007/0157097 | A1 * | 7/2007 | Peters | 715/764 |

OTHER PUBLICATIONS

"Hands on with iOS 4 folders". Macworld, Jun. 21, 2010. http://www.macworld.com/article/1152168/ios4folders.html. 6 pages.*
"Apple iOS 4 Release Date—Jun. 21". Gadget Venue, Jun. 7, 2010. http://www.gadgetvenue.com/apple-ios-4-release-date-june-21-06075017/. 2 pages.*

* cited by examiner

*Primary Examiner* — Michael Roswell
(74) *Attorney, Agent, or Firm* — Myers Bigel Sibley & Sajovec, P.A.

(57) ABSTRACT

Systems and methods of arranging a plurality of icons on a touch sensitive display device of a computing device include receiving contact information from the touch sensitive display device indicating a first and a second one of the plurality of icons have been moved until they touch each other on the touch sensitive display device. A new folder is automatically created responsive to the received contact information indicating the first and second icons have been moved until they touch. The new folder includes stored resources of the computing device associated with the first and the second icons. The first and second icons are replaced on the touch sensitive display device with a new icon associated with the new folder.

20 Claims, 7 Drawing Sheets

METHODS, SYSTEMS AND COMPUTER PROGRAM PRODUCTS FOR ARRANGING A PLURALITY OF ICONS ON A TOUCH SENSITIVE DISPLAY

FIELD OF THE INVENTION

This invention relates to user interfaces for electronic devices, and more particularly to touch panel interfaces for electronic devices such as wireless communication terminals.

BACKGROUND OF THE INVENTION

Touch panels and, more particularly, touch screens are becoming a popular interface on electronic devices for users to enter commands and data used in the operation of the device. Touch screens can now be found in mobile telephones, particularly cellular telephones having integrated PDA (personal digital assistant) features and other phone operation related features. The touch screens are generally designed to operate and respond to a finger touch, a stylus touch, or finger/stylus movement on the touch screen surface. Touch screens may be used in addition to, in combination with, or in place of physical keys traditionally used in a cellular phone to carry out the phone functions and features.

Touching a specific point on the touch screen display may activate a virtual button, feature, or function found or shown at that location on the touch screen display. Typical phone features which may be operated by touching the touch screen display include entering a telephone number, for example, by touching virtual keys of a virtual keyboard shown on the display, making a call or ending a call, bringing up, adding to or editing and navigating through an address book, and other phone functions such as text messaging, wireless connection to the global computer network, and other phone functions.

Touch screen mobile devices generally provide organization of various applications and the like represented by icons on a touch sensitive display screen using a flat hierarchy of applications. Operating systems for such devices typically allow a user the ability to create a folder. The folder may then be used, for example, to hold a plurality of photos, contacts, or the like. The sequence for creating such a structure is typically that a user goes through a menu-type application of the device and then selects a create folder application. Once the folder has been created, the user may then place items within the folder, a sometimes cumbersome, multi-step process requiring edit mode and menu access.

Commercial pressures to provide far greater user convenience for utilizing the additional functionality of touch sensitive display devices is continuing to drive the need to develop improved usability of these devices.

SUMMARY OF INVENTION

In some embodiments of the present invention, computer-implemented methods of arranging a plurality of icons on a touch sensitive display device of a computing device include receiving contact information from the touch sensitive display device indicating a first and a second one of the plurality of icons have been moved until they touch each other on the touch sensitive display device. A new folder is automatically created responsive to the received contact information indicating the first and second icons have been moved until they touch. The new folder includes stored resources of the computing device associated with the first and the second icons. The first and second icons are replaced on the touch sensitive display device with a new icon associated with the new folder.

In other embodiments, receiving contact information is preceded by entering an edit mode of the computing device responsive to detecting selection of the edit mode. Automatically creating a new folder responsive to the received contact information is only carried out in the edit mode. Automatically creating the new folder may be followed by automatically exiting the edit mode. The first icon may be associated with a first stored resource of the computing device and the second icon may be associated with a second stored resource of the computing device, different from the first stored resource of the computing device. The new folder may include the first and second stored resources of the computing device. The stored resources of the computing device may be, for example, an executable application.

In further embodiments, replacing the first and second icons is followed by receiving contact information from the touch sensitive display device indicating the new icon has been selected. The first and second icons are displayed on the touch sensitive display device responsive to selection of the new icon. Displaying the first and second icons may be preceded by removing some or all of the icons being displayed by the touch sensitive display device when the contact information indicating the new icon has been selected is received.

In other embodiments, the first icon has an associated first initial location on the touch sensitive display device and the second icon has an associated second initial location of the touch sensitive display device. Replacing the first and second icons on the touch sensitive display device with a new icon associated with the new folder includes displaying the new icon at either the first initial location or the second initial location.

In yet other embodiments, receiving contact information is preceded by receiving preliminary information from the touch sensitive display device indicating the first and the second one of the plurality of icons have been moved away from each other. Automatically creating a new folder responsive to the received contact information is only carried out when the received preliminary information is received no more than a selected time period before the received contact information.

In further embodiments, the first icon is associated with a first folder including at least one stored resource of the computing device and the second icon is associated with a second folder including at least one stored resource of the computing device. The new folder includes the at least one stored resource of the computing device included in the first folder and the at least one stored resource of the computing device included in the second folder. The first folder may include a plurality of stored resources of the computing device, each of which has an associated icon, and the second folder may include a plurality of stored resources of the computing device, each of which has an associated icon. Replacing the first and second icons may be followed by receiving contact information from the touch sensitive display device indicating the new icon has been selected and displaying all of the icons associated with the stored resource of the computing device included in the first and second folder on the touch sensitive display device responsive to selection of the new icon.

In yet further embodiments of the present invention, computing devices are provided including a memory including a plurality of stored resources of the computing device, each having an associated icon. The computing device further includes a display device that is configured to display selected ones of the icons and a touch panel interface coupled to a touch panel associated with the display device that is configured to receive information from the touch panel indicating movement of displayed ones of the icons. A file creation module is coupled to the touch panel interface that is configured. to determine that a first and second one of the displayed icons have been moved until they touch and to automatically create a new folder responsive to determining that the first and second icons have been moved until they touch and to request display of a new icon associated with the new folder instead of the first and second ones of the displayed icons.

In other embodiments, the file creation module is further configured to enter an edit mode of the computing device responsive to detecting selection of the edit mode and to automatically create the new folder responsive to determining that the first and second one of the displayed icons have been moved until they touch only in the edit mode. Automatically creating the new folder may be followed by automatically exiting the edit mode.

In further embodiments, the first icon is associated with a first stored resource of the computing device and the second icon is associated with a second stored resource of the computing device, different from the first stored resource of the computing device. The new folder includes the first and second stored resources of the computing device. The file creation module is further configured to receive contact information from the touch panel interface indicating the new icon has been selected and request display of the first and second icons on the touch panel responsive to selection of the new icon.

In yet other embodiments, the file creation module is further configured to determine that a first and second one of the displayed icons have been moved away from each other and to automatically create the new folder only when it is determined that the first and second icons were moved away from each other no more than a selected time period before it is determined that the first and second icons have been moved until they touch.

In further embodiments, computer program products for arranging a plurality of icons on a touch sensitive display device of a computing device are provided including a computer-readable storage medium having computer-readable program code embodied in said medium. The computer-readable program code includes computer-readable program code that receives contact information from the touch sensitive display device indicating a first and a second one of the plurality of icons have been moved until they touch each other on the touch sensitive display device. The computer-readable program code further includes computer-readable program code that automatically creates a new folder responsive to the received contact information indicating the first and second icons have been moved until they touch, wherein the new folder includes stored resources of the computing device associated with the first and the second icons and computer-readable program code that replaces the first and second icons on the touch sensitive display device with a new icon associated with the new folder.

Computer program products and computing devices including other aspects of the methods described above are also provided.

DETAILED DESCRIPTION OF PREFERRED EMBODIMENTS

Figure 1:
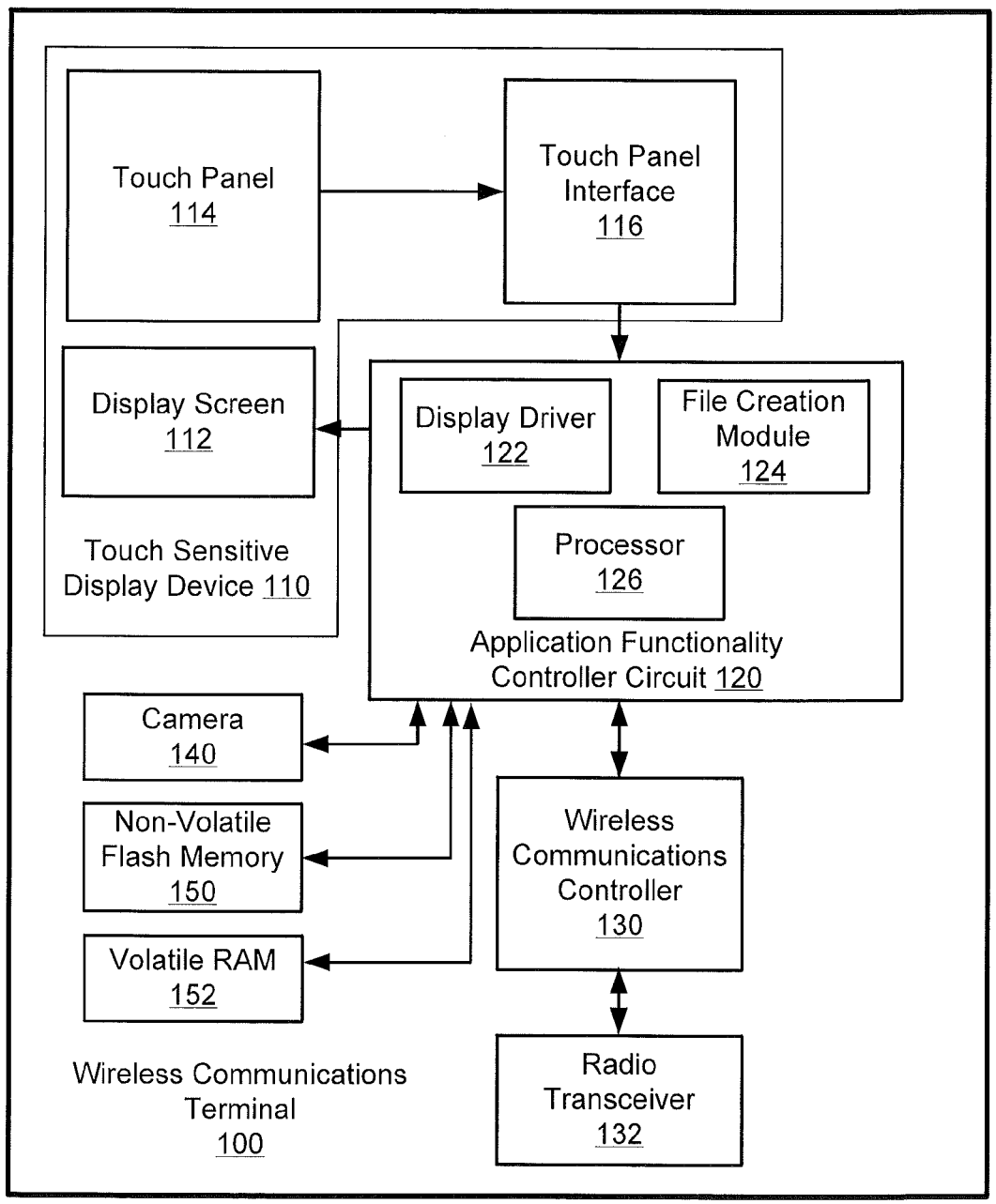
FIG. 1 is a block diagram of a mobile communication terminal that is configured to operate in accordance with some embodiments of the present invention.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of wireless communication terminals for purposes of illustration and explanation only, the present invention is not limited thereto. It is to be understood that the present invention can be more broadly used in any sort of electronic device to arrange a plurality of icons on a display device.

FIG. 1 is a block diagram of an electronic computing device, shown as a wireless communication terminal 100, that is configured to operate in accordance with some embodiments of the present invention. Although various embodiments are described in the context of the mobile communication terminal 100, the invention is not limited thereto as it may be embodied in any type of computing device that includes a touch sensitive display device. For example, the invention may be embodied in laptop computers or other devices that have touchpads where the user's touch locations can be input via the touchpads with corresponding indicia displayed on the screen.

Referring to FIG. 1, the terminal 100 includes a touch sensitive display device (display) 110, an application functionality controller circuit (functionality controller) 120, a wireless communications controller circuit (communications controller) 130, a radio transceiver 132, a camera device 140, nonvolatile memory 150 (e.g., flash memory), and volatile memory 152 (e.g., dynamic/static RAM). The term "controller" refers to digital circuitry, such as a general/special purpose processor that executes computer readable program code from a storage medium, and/or analog circuitry. The terminal 100 may include other devices, such as buttons, keypad, keyboard, speaker, microphone, etc.

The display 110 may be any suitable assembly that is configured to display graphical images and to detect user touch selections thereon and convert the detected touches into positional information that can be processed by the functionality controller 120. The display 110 may include a display screen 112, a touch panel 114, and a touch panel interface 116. The display screen 112 may be a liquid crystal display (LCD) with or without auxiliary lighting (e.g., a lighting panel). In some cases the display screen 112 may be capable of displaying pictures and/or playing video content of a particular format (e.g., X and Y pixel count and/or aspect ratio). Exemplary video formats that may be supported by the display screen 112 may include, without limitation, Quarter VGA (QVGA, 320×240 pixels), Common Intermediate Format (CIF, 360×288 pixels) and Quarter Common Intermediate Format (QCIF, 180×144 pixels).

The touch panel 114 may be configured as a resistive touchscreen panel, a capacitive touchscreen panel, a side-optical touchscreen panel, and/or another touch sensitive panel technology. A resistive touchscreen panel can include two spaced-apart thin metallic electrically conductive and resistive layers that connect to conduct electrical current at one or more locations where a user touches the display screen 112. This electrical current can be used by the touch panel interface circuit 116 to detect the coordinate locations of the one or more locations where the user is touching the display screen 112. As such, the touch panel interface 116 coupled to the touch panel 114 of the display device 110 is configured to receive information from the touch panel 114 indicating movement of a finger or the like by a user along the touch panel 114, which movement may be associated with displayed icons on the display screen 112.

A capacitive touchscreen panel can be coated with a material, such as indium tin oxide, that conducts a continuous electrical current across a sensor to form a controlled field of stored electrons in both X and Y axes. When the capacitance field of the capacitive touchscreen panel is altered by another capacitance field, e.g., a user's finger, the touch panel interface 116 can measure the distortion and identify X and Y axes location(s) of the disturbance.

A side-optical touchscreen panel can include a grid of optical detectors on top of the surface of the display screen 112. Light is sent from one side to the other and received by an array of detectors. The beams of light are broken when a finger or stylus is in close proximity such that the location can be translated into X and Y coordinates by the touch panel interface 116.

Although various embodiments are described in the context of the sensing locations of where the user physically touches the display 112, the invention is not limited thereto. In some other embodiments, the terminal 100 can be configured to use a camera, infra-red (IR) light source and sensor(s), etc. to detect gestures by the user that are proximately located to the screen 112. For example, the display 112 may include an array of IR light sources and sensors arranged between various pixel locations on the display surface that can sense the x-y locations of fingers that are adjacent to, but not touching, the display 112. Accordingly, as used herein, the term "touch points" refers to locations on the screen where fingers or other user controlled objects are physically touching and/or adjacent to the display 112.

The camera device 140 includes an imaging circuit, such as a CCD (charge-coupled device), CMOS (complementary MOS) or other type of image sensor, and can be configured to record still images and/or moving images as digital images that are suitable for display and/or manipulation.

The wireless communications controller 130 is configured to communicate data over the radio transceiver 132 according to one or more communication protocols, such as one or more cellular communication protocols and/or other communication protocols. The cellular communication protocols may include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The other communication protocols may include, but are not limited to, Bluetooth, RFID, and/or WLAN (e.g., 802.11a, 802.11b, 802.11e, 802.11g, and/or 802.11i).

The application functionality controller circuit 120 is shown as including a processor 126, a display driver 122 and a file creation module 124. The display driver 122 is configured to communicate with the touch sensitive display device 110 to control what is displayed on the display screen 112, the processor 126 may be a general purpose or specialty processor configured to execute computer readable program code to support operations of the display driver 122 and/or the file creation module 124. It will further be understood that the processor may also support functionality of other illustrated modules of the wireless communications terminal 100, such as the wireless communications controller 130. However, in other embodiments, the wireless communications terminal 100 may include a plurality of processors carrying out operations of the communications terminal 100.

In some embodiments, the memory 150 and/or the memory 152 include a plurality of stored resources of the computing device, each having an associated icon. The stored resources may be referred to herein as "files" stored in the memory 150, 152. As used herein, the term "file" refers to a complete named collection of information, such as a program, a set of data used by a program, and/or a user-created document. A file is a unit of storage that allows a data processing system or a computer to distinguish one set of information from another. Thus, a file may include, but is not limited to, such diverse items as software programs or executable applications, firmware programs or applications, documentation/image files, printer fonts, web files, and the like. The file creation module 124 may be coupled to the touch panel interface 116 and be configured, to determine if and when a first and second selected ones of the icons displayed on the display screen 112 of the display device 110 have been moved until they touch and/or moved away from each other. The file creation module 124 may also be configured to automatically create a new folder responsive to determining that the first and second icons have been moved until they touch and to request display on the display screen 112 of a new icon associated with the new folder instead of the first and second ones of the displayed icons It is to be understood that the present invention is not limited to the particular configuration shown in FIG. 1, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture of FIG. 1 may be implemented as a single processor system or a multiprocessor system in accordance with various embodiments of the present invention.

Various embodiments of the present invention provide a simplified "one-step" technique whereby a user can organize two displayed icons into a single folder. As such, a user may be able to create folders and add applications to the folder in a single step without the need for use of an "options" menu or the like. As such, rather than solely display icons using a flat main menu hierarchy, applications may be organized into folders as an improved method of organization of large numbers of applications or the like on touch panel display of computing devices. Note that will discussions herein refer to moving two icons together, embodiments as described below may also be used with three or more icons being dragged together.

Operations for arranging a plurality of icons on a touch panel display device responsive to user input from the touch panel display device in accordance with some embodiments of the present invention will now be described with reference to the schematic illustrations of a mobile terminal in FIGS. 2A through 2J. Referring first to FIG. 2A, a home screen mode of the mobile terminal 200 is shown. Mobile terminal 200 includes a touch sensitive display device having four exemplary icons shown thereon. The icons 210 include a photo file folder, a contacts application, an e-mail message, and a music application. Also shown is a drag icon 220, which a user may touch and pull up to see additional application icons available using the flat hierarchy of application display of the mobile terminal 200. The illustrated mobile terminal further includes a plurality of hard function buttons 230 that may be assigned functions either permanently or in connection with associated displayed icons on the display screen. For example, the three buttons may be associated with calling up display related functionalities such as a menu key, a home key or a back key for scrolling through various informational screen displays on the mobile terminal 200.

As seen in FIG. 2A, for the illustrated embodiments, a user selects an edit mode of the mobile terminal 200 by using a long press on one of the displayed icons. As shown in FIG. 2B, once the edit mode is entered, the drag icon 220 is replaced by a trashcan icon 240. In the edit mode, the user can, for example, move icons 210 around on the screen or delete one or more of the icons.

Figure 2C:
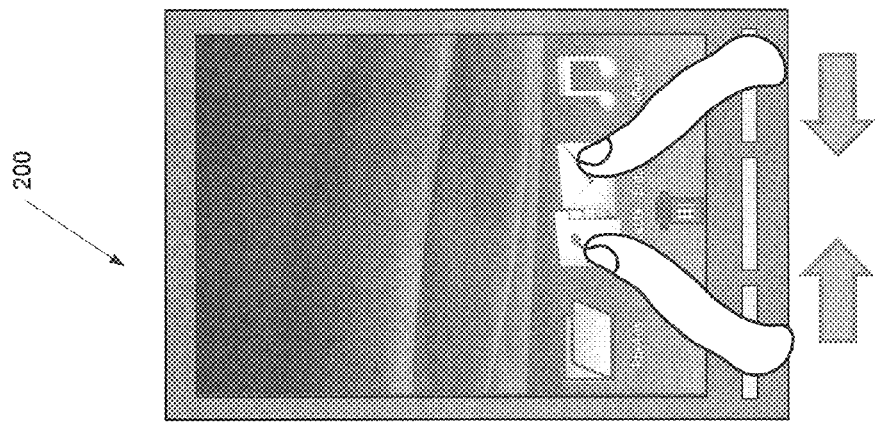
FIGS. 2A through 2J are schematic illustrations of operations for arranging a plurality of icons on a touch panel display device responsive to user input from the touch panel display device in accordance with some embodiments of the present invention.
Figure 2B:
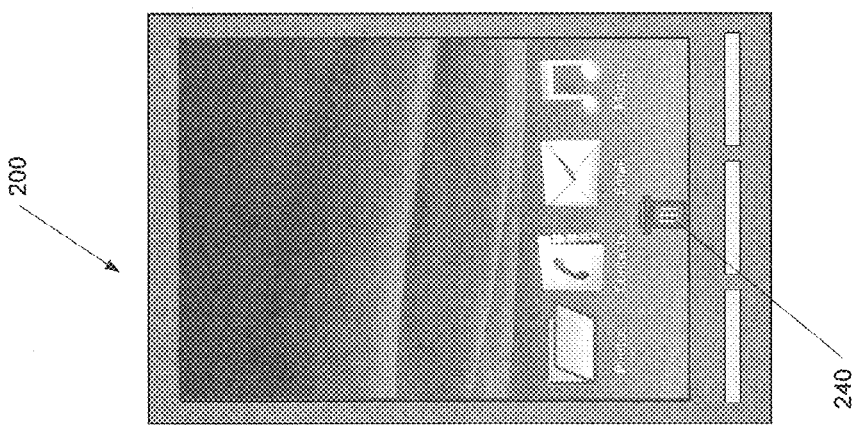
Figure 2A:
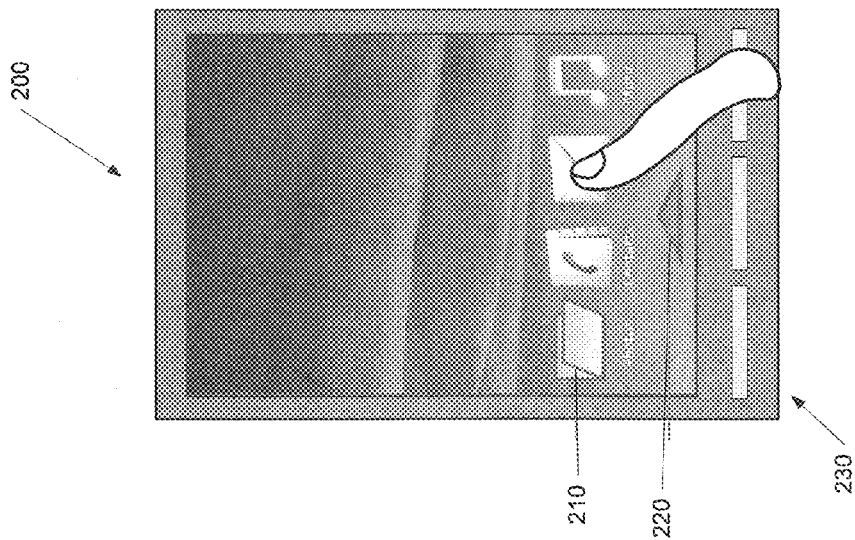

As seen in FIG. 2C, while still in the edit mode, a user touches two of the icons, the contacts and e-mail icons in the example in FIG. 2C, and moves the two selected icons together until they touch. According to some embodiments of the present invention as illustrated in FIG. 2D, responsive to the movement of the two icons until they touch, a new folder 250 is created that will automatically appear on the display of the mobile terminal 200. For the embodiments shown in FIG. 2D, the new folder 250 is placed in the position of the first of the two selected icons 210 and the first and second selected icons 210 are no longer displayed. As also shown in the embodiments of FIG. 2D, upon creation of the new folder 250, the mobile terminal 200 automatically exits the edit mode and the drag icon 220 appears again in place of the trashcan icon 240.

The folder 250 will contain the associated stored resources from the contacts and e-mail icons originally displayed and touched together. A user may view the contents of the new folder 250 by touching the folder as indicated in FIG. 2E, which will result in display of the icon for the corresponding contained computer resources seen in FIG. 2F, where the icons for contacts and e-mail are shown below a banner line giving the folder name of the new folder 250, shown simply as "Folder" in the figures.

Figure 2F:
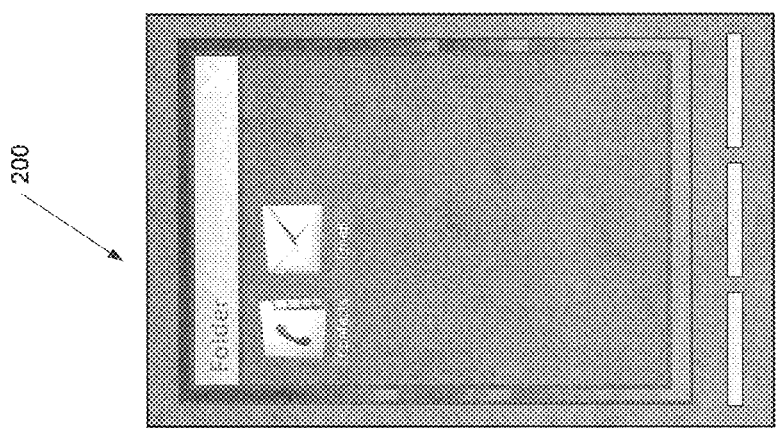
Figure 2E:
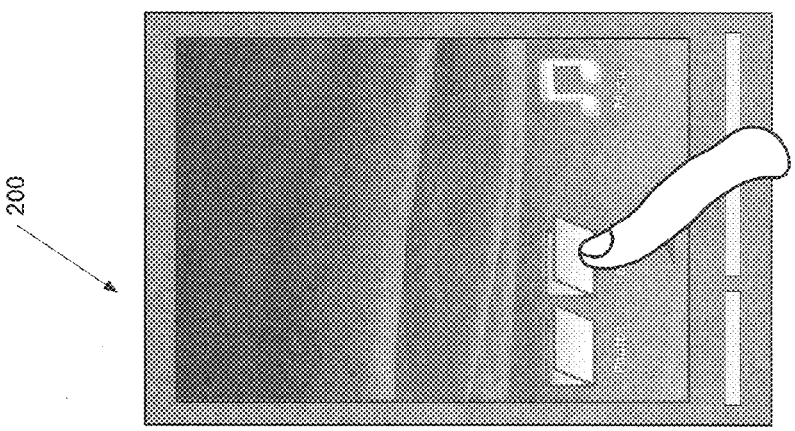
Figure 2D:
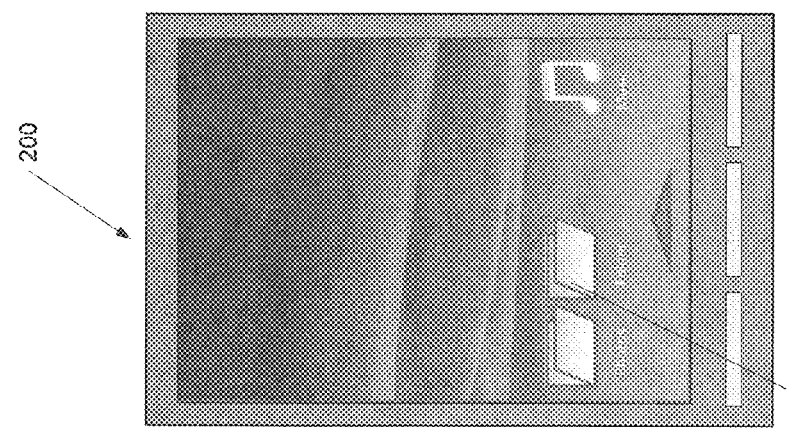
Figure 2H:
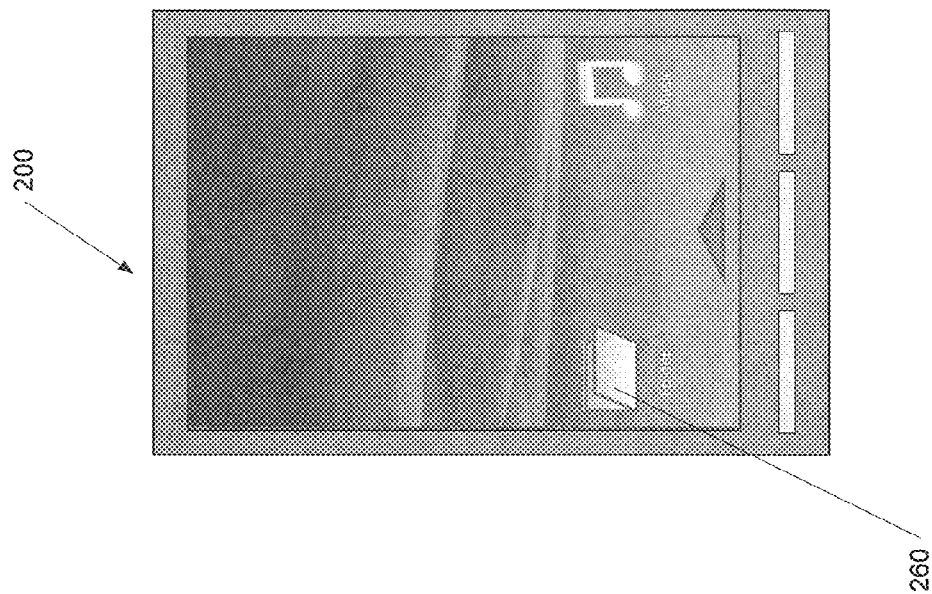

As such, when contact information is received from the touch sensitive display device indicating the new icon has been selected, the first and second icons are displayed on the touch sensitive display device responsive to selection of the new icon as seen in FIGS. 2E and 2F. As seen in FIG. 2F, display of the first and second icons is preceded by removing at the icons being displayed by the touch sensitive display device when the contact information indicating the new icon has been selected is received.

Figure 2G:
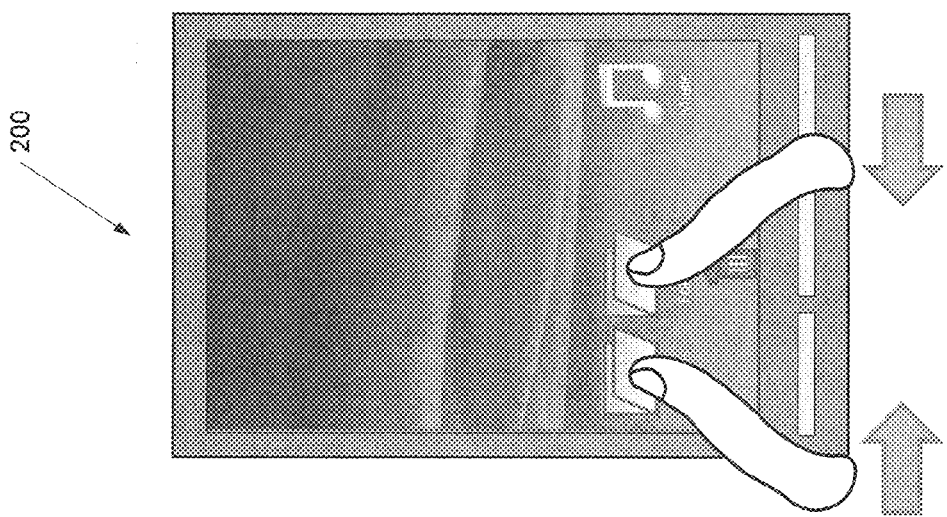

In further embodiments of the present invention as will now be described with reference to FIGS. 2G through 2J, such a "one-step" process as described above may be applied to two icons representing, respectively, different folders with different contents. As seen in FIG. 2G, icons representing two distinct folders are contacted and moved together until they touch while in the edit mode of the mobile terminal 200. This motion results automatically in the creation of a new folder 260, shown as having the folder name "folder" in FIG. 2H. As also shown by the change in the trashcan icon to the drag icon, some embodiments automatically exit the edit mode of the mobile terminal 200 on creation of the new folder 260.

Figure 2J:
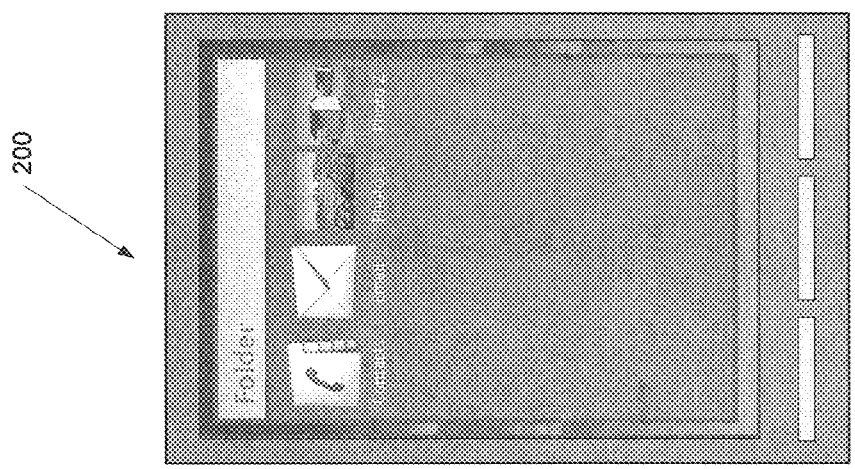
Figure 2I:
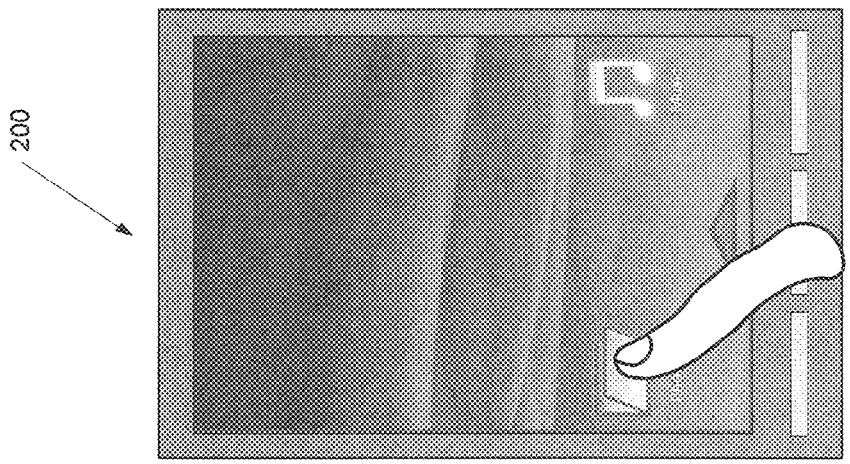

The new folder 260 includes the contents of both of the folders that were touched together as described with reference to FIG. 2G as can be seen in FIGS. 2I and 2J. As seen in FIG. 2I, the user touches the new folder 260, which causes the display to change to show the contents of the folder as seen in FIG. 2J, where the icons appear for Contacts and Email from one of the two original folders and Photo 1 and Photo 2 from the other of those folders. Note that, in FIG. 2I, the name of the new folder has been edited by the user to change from "Folder" to "Photo". As will be further described herein, the movement operations as described with reference to FIG. 2G and with respect to FIG. 2C may, in some cases, require the user to first move the icons away from each other followed by moving them towards each other until they touch, which embodiments may reduce the risk of inadvertent automatic creation of a folder by a user.

Thus, as described above in various embodiments of the present invention, a user may create a folder and add applications associated with icons (or other computer resources/files) to the folder in an efficient operation where the user first enters the edit mode, then selects two applications, moves them apart and then back together, and a folder is automatically created and displayed that contains both of the applications (or other computer resources/files) from the originally selected two folders.

Figure 3:
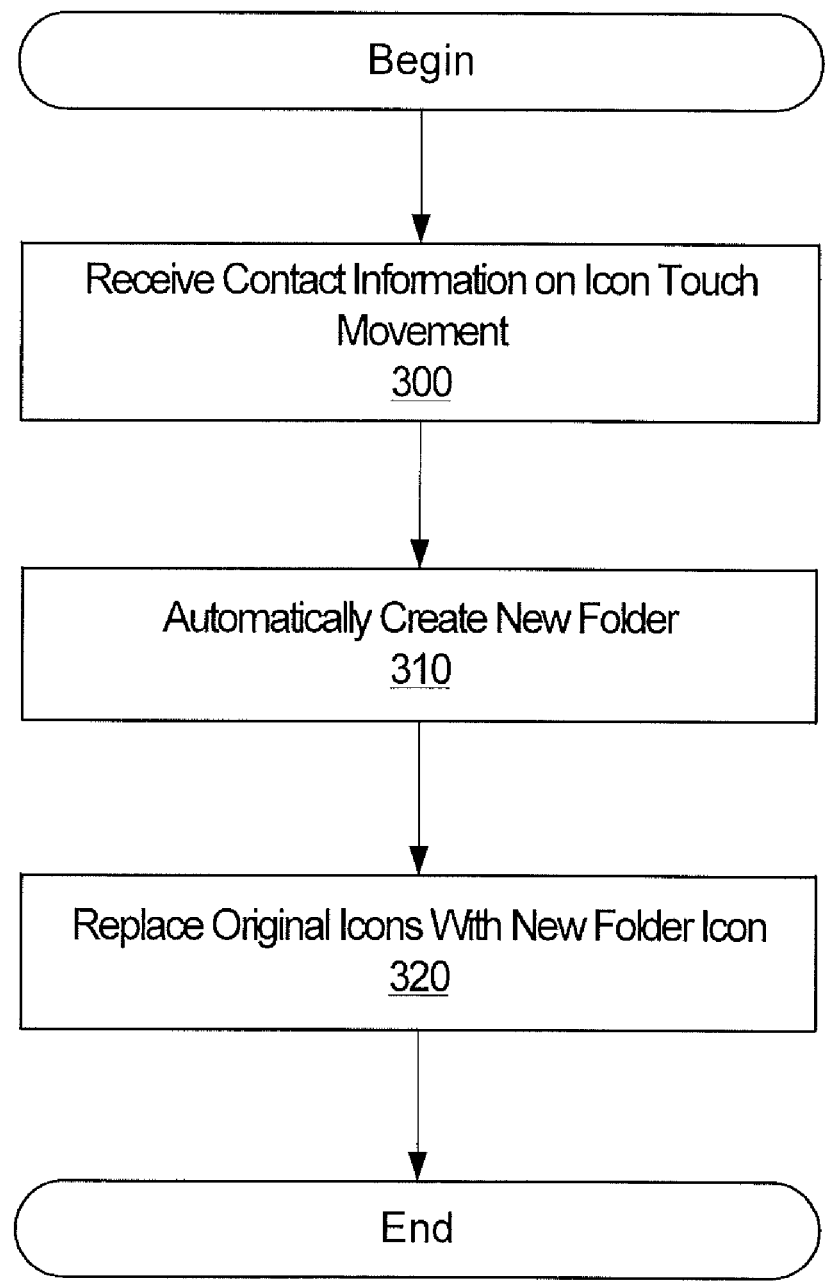
FIG. 3 is a flowchart of operations for arranging a plurality of icons on a touch panel display device responsive to user input from the touch panel display device in accordance with some embodiments of the present invention.
Figure 4:
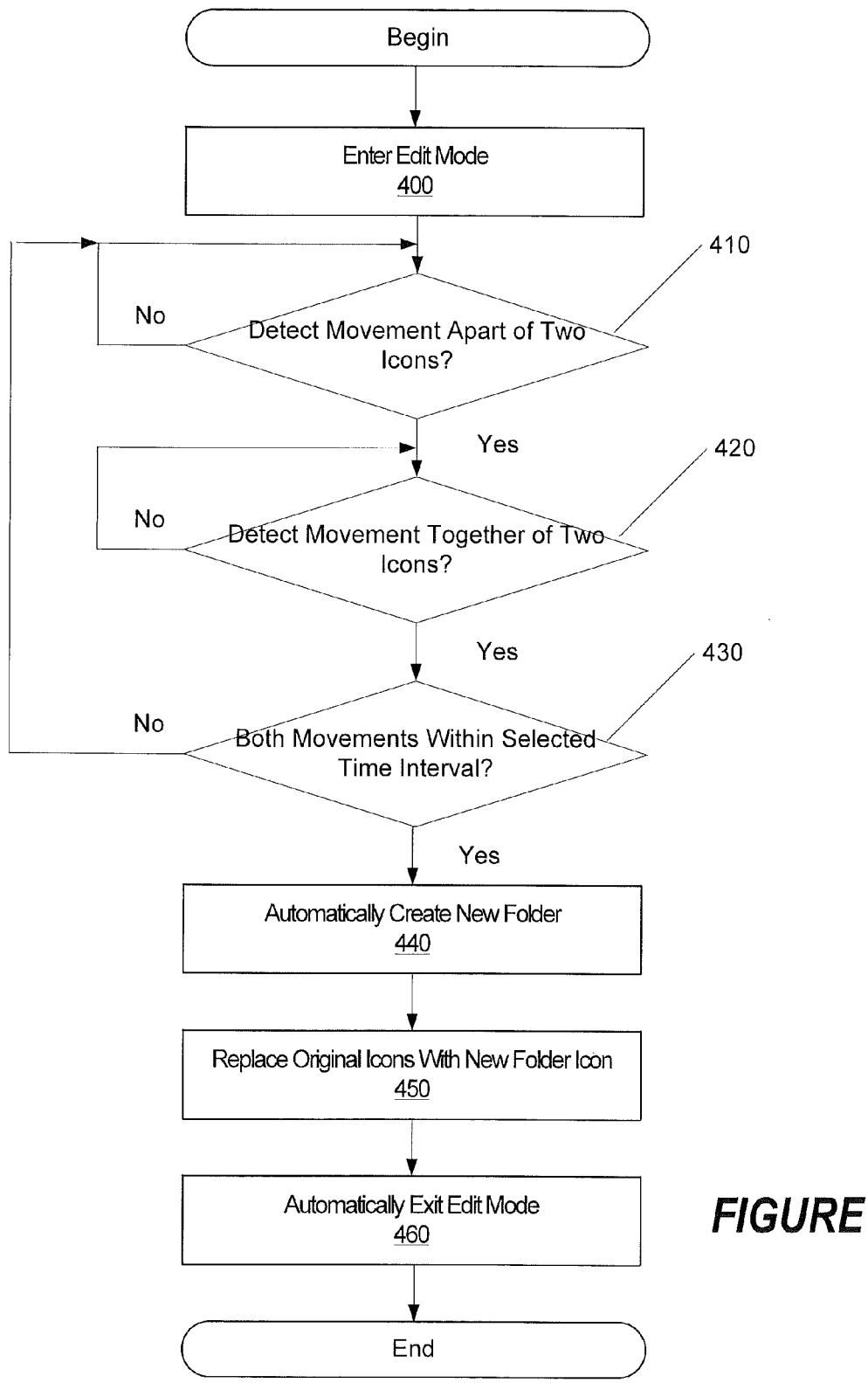
FIG. 4 is a flowchart of operations for arranging a plurality of icons on a touch panel display device responsive to user input from the touch panel display device in accordance with further embodiments of the present invention.

Methods of arranging a plurality of icons on a touch sensitive display device of a computing device according to some embodiments of the present invention will now be further described with reference to the flowchart illustrations of FIGS. 3 and 4. Referring first to the embodiments of FIG. 3, operations begin at Block 300 by receiving contact information from the touch sensitive display device indicating a first and a second one of the plurality of icons have been moved until they touch each other on the touch sensitive display device. A new folder is automatically created responsive to the received contact information indicating the first and second icons have been moved until they touch (Block 310). As used herein, "automatically" refers to operations carried out without further user input. The new folder includes stored resources of the computing device, such as files identifying executable applications, media files or the like, associated with the first and the second icons. The first and second icons are replaced on the touch sensitive display device with a new icon associated with the new folder (Block 320).

Further embodiments will now be described with reference to FIG. 4. For the embodiments of FIG. 4, operations begin at Block 400 by entering an edit mode of the computing device responsive to detecting selection of the edit mode. It is determined if preliminary information has been received from the touch sensitive display device indicating the first and the second one of the plurality of icons have been moved away from each (Block 410). If the preliminary information has not been received, operations do not proceed to automatically creating a new folder. When the preliminary information is received at Block 410, it is determined if contact information has been received from the touch sensitive display device indicating a first and a second one of the plurality of icons have been moved until they touch each other on the touch sensitive display device (Block 420). If the contact information has not been received, operations do not proceed to automatically creating a new folder. When the contact information is received at Block 420, it is determined if the received preliminary information has been received no more than a selected time period before the received contact information (Block 430). If the contact information has not been received within the selected time period after the preliminary information, operations do not proceed to automatically creating a new folder. When the contact information has been received within the selected time period after the preliminary information at Block 430, a new folder is automatically created (Block 440). As described with reference to Block 310 of FIG. 3, the new folder includes stored resources of the computing device, such as files identifying executable applications, media files or the like, associated with the first and the second icons. The first and second icons are replaced on the touch sensitive display device with a new icon associated with the new folder as described with reference to Block 320 of FIG. 3 (Block 450). Following creation of the new folder, the edit mode is automatically exited (Block 460).

In some embodiments, the first of the two icons that are touched together has an associated first initial location on the touch sensitive display device and the second of the two icons has an associated second initial location of the touch sensitive display device. Operations at Blocks 320 and 450 may include replacing the first and second icons on the touch sensitive display device with the new icon, where the new icon is displayed at either the first initial location or the second initial location. In some embodiments, the first icon is associated with a first folder including at least one stored resource of the computing device and the second icon is associated with a second folder including at least one stored resource of the computing device. The new folder includes the at least one stored resource of the computing device included in the first folder and the at least one stored resource of the computing device included in the second folder.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A computer-implemented method of arranging a plurality of icons on a touch sensitive display device of a computing device, comprising:
    receiving contact information from the touch sensitive display device indicating a first and a second one of the plurality of icons have been moved until they touch each other on the touch sensitive display device;
    automatically creating a new folder responsive to the received contact information indicating the first and second icons have been moved until they touch, wherein the new folder includes stored resources of the computing device associated with the first and the second icons; and
    replacing the first and second icons on the touch sensitive display device with a new icon associated with the new folder.

2. The method of claim 1, wherein receiving contact information is preceded by entering an edit mode of the computing device responsive to detecting selection of the edit mode and wherein automatically creating a new folder responsive to the received contact information is only carried out in the edit mode.

3. The method of claim 2, wherein automatically creating the new folder is followed by automatically exiting the edit mode.

4. The method of claim 1, wherein the first icon is associated with a first stored resource of the computing device and the second icon is associated with a second stored resource of the computing device, different from the first stored resource of the computing device, and wherein the new folder includes the first and second stored resources of the computing device.

5. The method of claim 4, wherein replacing the first and second icons is followed by:
    receiving contact information from the touch sensitive display device indicating the new icon has been selected; and
    displaying the first and second icons on the touch sensitive display device responsive to selection of the new icon.

6. The method of claim 5, wherein the displaying the first and second icons is preceded by removing at least some of the icons being displayed by the touch sensitive display device when the contact information indicating the new icon has been selected is received.

7. The method of claim 1, wherein the first icon has an associated first initial location on the touch sensitive display device and the second icon has an associated second initial location of the touch sensitive display device and wherein replacing the first and second icons on the touch sensitive display device with a new icon associated with the new folder includes displaying the new icon at either the first initial location or the second initial location.

8. The method of claim 1, wherein receiving contact information is preceded by receiving preliminary information from the touch sensitive display device indicating the first and the second one of the plurality of icons have been moved away from each other and wherein automatically creating a new folder responsive to the received contact information is only carried out when the received preliminary information is received no more than a selected time period before the received contact information.

9. The method of claim 1, wherein the first icon is associated with a first folder including at least one stored resource of the computing device and wherein the second icon is associated with a second folder including at least one stored resource of the computing device and wherein the new folder includes the at least one stored resource of the computing device included in the first folder and the at least one stored resource of the computing device included in the second folder.

10. The method of claim 9, wherein the first folder includes a plurality of stored resources of the computing device, each of which has an associated icon and the second folder includes a plurality of stored resources of the computing device, each of which has an associated icon and wherein replacing the first and second icons is followed by:
   receiving contact information from the touch sensitive display device indicating the new icon has been selected; and
   displaying all of the icons associated with the stored resource of the computing device included in the first and second folder on the touch sensitive display device responsive to selection of the new icon.

11. The method of claim 1, wherein at least one of the stored resources of the computing device comprises an executable application.

12. The electronic device of claim 1, wherein at least one of the stored resources of the computing device comprises an executable application.

13. A computing device comprising:
   a memory including a plurality of stored resources of the computing device, each having an associated icon;
   a display device that is configured to display selected ones of the icons;
   a touch panel interface coupled to a touch panel associated with the display device that is configured to receive information from the touch panel indicating movement of displayed ones of the icons; and
   a file creation module coupled to the touch panel interface that is configured. to determine that a first and second one of the displayed icons have been moved until they touch and to automatically create a new folder responsive to determining that the first and second icons have been moved until they touch and to request display of a new icon associated with the new folder instead of the first and second ones of the displayed icons.

14. The electronic of claim 13, wherein the file creation module is further configured to enter an edit mode of the computing device responsive to detecting selection of the edit mode and to automatically create the new folder responsive to determining that the first and second one of the displayed icons have been moved until they touch only in the edit mode.

15. The electronic device of claim 14, wherein automatically creating the new folder is followed by automatically exiting the edit mode.

16. The electronic device of claim 13, wherein the first icon is associated with a first stored resource of the computing device and the second icon is associated with a second stored resource of the computing device, different from the first stored resource of the computing device, and wherein the new folder includes the first and second stored resources of the computing device and wherein the file creation module is further configured to:
   receive contact information from the touch panel interface indicating the new icon has been selected; and
   request display of the first and second icons on the touch panel responsive to selection of the new icon.

17. The electronic device of claim 13, wherein the file creation module is further configured to determine that a first and second one of the displayed icons have been moved away from each other and to automatically create the new folder only when it is determined that the first and second icons were moved away from each other no more than a selected time period before it is determined that the first and second icons have been moved until they touch.

18. A computer program product for arranging a plurality of icons on a touch sensitive display device of a computing device, the computer program product comprising:
   a non-transitory computer-readable storage medium having computer-readable program code embodied in said medium, said computer-readable program code comprising:
   computer-readable program code that receives contact information from the touch sensitive display device indicating a first and a second one of the plurality of icons have been moved until they touch each other on the touch sensitive display device;
   computer-readable program code that automatically creates a new folder responsive to the received contact information indicating the first and second icons have been moved until they touch, wherein the new folder includes stored resources of the computing device associated with the first and the second icons; and
   computer-readable program code that replaces the first and second icons on the touch sensitive display device with a new icon associated with the new folder.

19. The computer program product of claim 18, further comprising computer-readable program code that enters an edit mode of the computing device responsive to detecting selection of the edit mode and wherein the computer-readable program code that automatically creates a new folder only creates the new folder in the edit mode.

20. The computer program product of claim 19, wherein the computer-readable program code that automatically creates the new folder automatically exits the edit mode after creating the new folder.

* * * * *

UNITED STATES PATENT AND TRADEMARK OFFICE
CERTIFICATE OF CORRECTION

| | | |
|---|---|---|
| PATENT NO. | : 8,386,950 B2 | Page 1 of 1 |
| APPLICATION NO. | : 12/754020 | |
| DATED | : February 26, 2013 | |
| INVENTOR(S) | : Henderson | |

It is certified that error appears in the above-identified patent and that said Letters Patent is hereby corrected as shown below:

In the Claims:
Column 11, Claim 13, Line 43:

Correct "that is configured. to determine"
    to read -- that is configured to determine --

Signed and Sealed this
Twenty-seventh Day of May, 2014

Michelle K. Lee
*Deputy Director of the United States Patent and Trademark Office*